April 7, 1970     E. LANGECKER     3,504,397
DEVICE FOR PRODUCING HOLLOW BODIES, BOTTLES
OR THE LIKE, OF PLASTICS MATERIAL
Filed Oct. 14, 1965     5 Sheets-Sheet 1
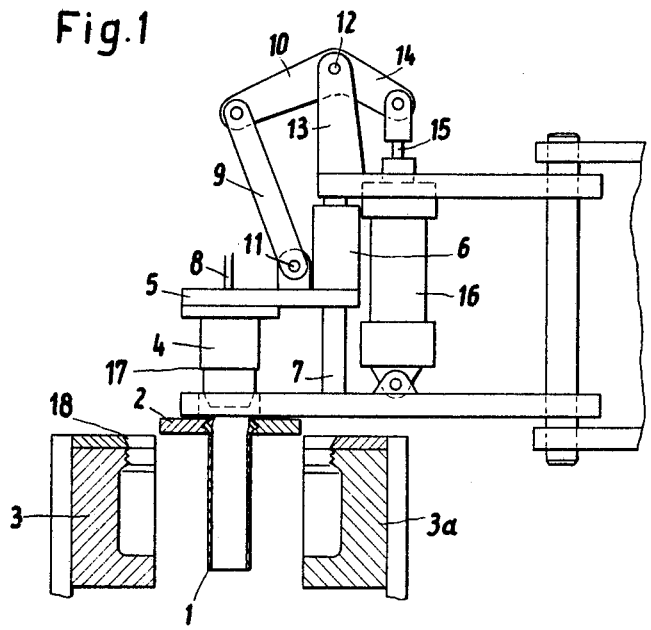
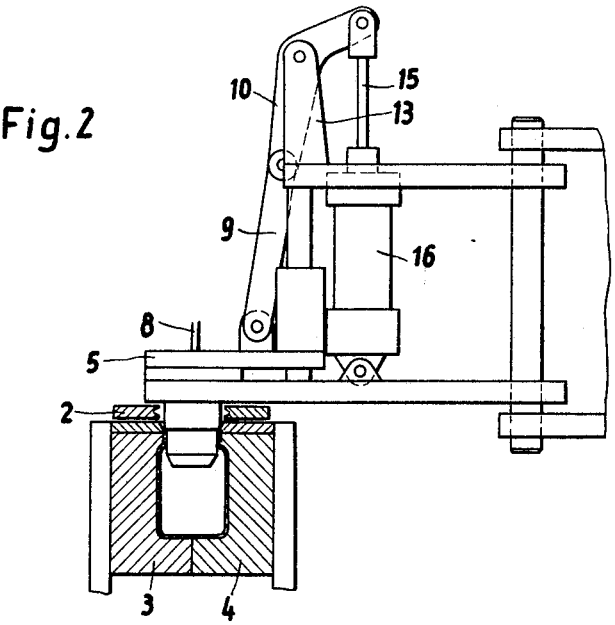
Inventor:
Erhard Langecker
By
Watson, Cole, Grindle & Watson
Attys.

Inventor:
Erhard Langecker
By
Watson, Cole, Grindle+Watson
Attys.

April 7, 1970  E. LANGECKER  3,504,397
DEVICE FOR PRODUCING HOLLOW BODIES, BOTTLES
OR THE LIKE, OF PLASTICS MATERIAL
Filed Oct. 14, 1965  3 Sheets-Sheet 3
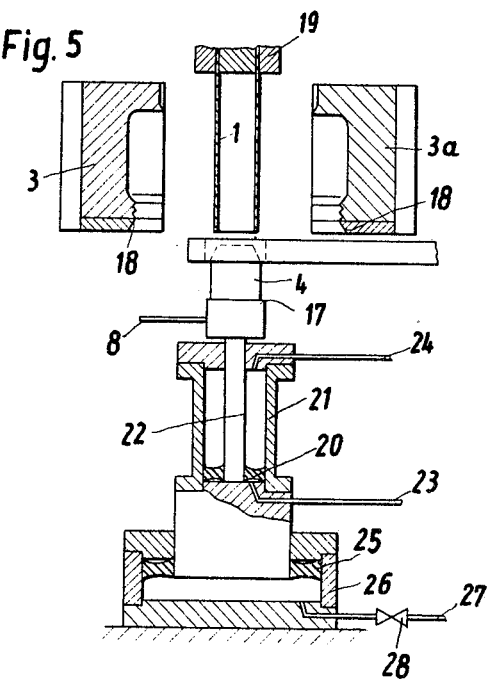
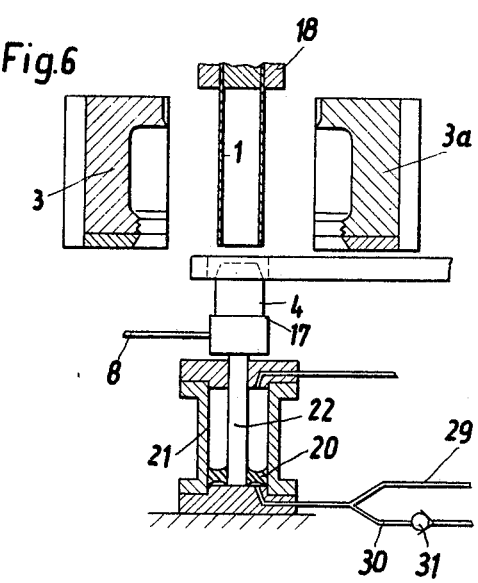
Inventor:
Erhard Langecker
By
Watson, Cole, Grindle & Watson
Attys.

United States Patent Office 3,504,397
Patented Apr. 7, 1970

3,504,397
DEVICE FOR PRODUCING HOLLOW BODIES, BOTTLES OR THE LIKE, OF PLASTICS MATERIAL
Erhard Langecker, Meinerzhagen, Germany, assignor to Gebr. Battenfeld, Westphalia, Germany, a German company
Filed Oct. 14, 1965, Ser. No. 495,923
Claims priority, application Germany, Oct. 23, 1964, B 79,040
Int. Cl. B29c 17/07; B29d 23/03
U.S. Cl. 18—5                    4 Claims

ABSTRACT OF THE DISCLOSURE

A method and device for the production of hollow bodies as bottles and the like of plastic material in which a mold press is actuated by a toggle lever by pressure means so that a mandrel is engaged into the mold at first by slight actuating pressure and then the mandrel movement is slowed down with simultaneous increase of the actuating pressure.

---

The present invention relates to a device for the production of hollow bodies, for example bottles or the like, of plastics material.

In the production of hollow bodies of thermoplastic synthetic material, such as for example bottles, cannisters, containers or the like, in the blast process, the procedure adopted is that from a plasticizing unit, for example an extruder, plasticized material is extruded downwardly in the shape of a tube out of a nozzle arranged on the said extruder and is conveyed into an open blast mould, between the hollow mould-parts of the same, of which there are at least two. The said blast mould is thereupon closed, and the tube blank is blown up by means of a blast mandrel to form the desired hollow body, i.e. bottle, cannister or the like, the internal and external diameter of the neck opening of the bottle or the like being given the necessary measurement, i.e. gauged.

In the production of hollow bodies as described above in the blast process the blast and gauge mandrel can be inserted into the tube blank either before the closing of the blast mould or thereafter. In both cases the actuating of the blast or gauge mandrel takes place directly by hydraulically or pneumatically actuated cylinders, and the depth of penetration of the said mandrel in the said blank as a rule is restricted by a buffer member.

In one of the known methods of operation the blast and gauging mandrel is inserted in the tube blank before the closing of the mould, and in this case the mandrel is held against the blast pressure by counterbearings disposed in the blast mould. In another known method of operation the blast or gauging mandrel is inserted in the blank after the closing of the mould, in which case the locking of the blast mandrel in the inserted position, by means of counter-bearings provided in the blast mould, is not possible for obvious reasons.

The present invention refers to such a method, i.e. in which the blast mandrel is inserted with closed mould. In this method the blast mandrel must be held against the blast pressure by its actuating member, i.e. by the pneumatic or hydraulic cylinder actuating it. When the neck openings of the containers are small, the diameters of these cylinders are comparatively small, but with large neck openings, that is to say with openings the internal diameter of which is large in relation to the wall thickness, the cylinder diameters with the use of pneumatic cylinders with the customary pressures must be selected correspondingly large, in order to withstand the inner pressure produced by the blast air and acting on the blast mandrel.

As the use of blast air generally speaking, in particular with high pressure, is not very economical, in cases where high pressures are necessary i.e. preferably with wide neck openings, one uses hydraulic cylinders; these, however, have the disadvantage that they move with uniform speed as a result of the incompressibility of the fluid, and as a result the separation of the waste takes place before the blowing-up of the tube is completed, so that as a consequence, in the completing of the blowing-up when the separating has taken place, material is drawn away from the cutting edge, with the result that the end surface of the neck opening, which frequently has to serve as sealing surface, is poorly defined. If the mandrel is introduced slowly into the neck opening in order to overcome the disadvantage mentioned above, then by the cooling of the material on the blast mandrel the material is pushed into the bottle, with a result that again a poorly defined inner surface of the neck opening results.

The task indicated in the method of the invention is to overcome the above-mentioned disadvantages by uniting the advantages, and to create a method in which a satisfactory separating off of the waste material and simultaneously a satisfactory forming of the inner surface and of the end surface serving as sealing surface of the neck opening, is ensured, with the use customary actuating cylinders for the blast mandrel, and without additional outlay being necessary.

The method of the invention has the feature that in the blast process the mandrel, under the effect of a slight actuating pressure, is rapidly inserted into the blank, and with slowing down of its movement with at the same time increase of the actuating pressure, is moved into the end-position which brings about the cutting off of the waste.

A further feature of the method of the invention consists in that the slowing down of the movement of the mandrel takes place in such a way that the blank, before the cutting-off, is brought by the mandrel to abut fully on the inner walling of the mould.

As a result of the initially rapid movement of the mandrel, the latter, during the blasting, is inserted rapidly into the opening of the tube blank, so that the said tube blank is closed rapidly by the gauging mandrel. During the slowing-down of the further movement of the gauging mandrel, the complete blowing-up of the tube blank takes place before the separating off of the waste material at the gauged neck opening. As a result of this it is reliably obtained that with the said wide neck bottles or wide neck cannisters, in which the wall thickness of the neck is very slight in relation to the neck diameter, a satisfactory sealing surface and at the same time a sure and well-defined separating-off of the waste material is ensured. If the separating-off of the waste material were to take place before the complete blowing-up, then material would be drawn away from the sealing surface through the blowing-up, with the result that the screw-threading and the sealing surface of the neck opening could not be satisfactorily formed. Accordingly, the method of the invention puts forward a substantial advantage over against the previously known method, in that it makes possible the creation of a satisfactory neck opening with satisfactory sealing end surface and simultaneously a satisfactory separating of the waste material.

The device which the invention proposes for carrying out the method has the feature that on the blast mandrel a stationary elbow lever is disposed, which can be moved by any desired actuating member, for the purpose of the insertion of the blast mandrel into the blank, from its bent position into an approximately straight position. The use in the invention of an elbow lever has the important advantage, together with the high end-pressure, and in spite of a small drive cylinder, that the initial speed of the gauging mandrel is very great and the opening in the tube blank is rapidly closed by the gauging mandrel, so that the tube blank is already blown up before the separating of the waste material takes place at the gauged opening.

A variation of the device for carrying out the method of the invention has the feature that the blast mandrel is fixed preferably directly on the movable part of an actuating member, the stationary part of which is received in a spring counterbearing, the spring-power of which can be adjusted. The springy counter-bearing of the actuating cylinder, the piston of which moves the blast mandrel directly, has also the effect that the blast mandrel is initially moved rapidly, with a comparatively slight pressure exerted by the blast mandrel, whereas on the subsequent final movement of the blast mandrel, as a result of the growing counter-force of the counter-bearing, a slowing down of the movement and simultaneously an increase of the actuating pressure is obtained. The springy counter-bearing can for example have the form of a compression cylinder which is filled with a compressible medium which is under a pressure that is below the final actuating pressure of the blast mandrel. On the insertion of the blast mandrel into the blank after the closure of the blank by the blast mandrel, and as a result of the high blast pressure, the counter-bearing withdraws until such time as the pressure obtained therein is equal to the final actuating pressure. By this withdrawal of the counter-bearing directed oppositely to the movement of the blast mandrel a slowing down of the movement and at the same time an increase of the actuating pressure of the blast mandrel is obtained. The springy element can of course be a spring of any desired construction, instead of a compression cylinder, the spring path and force of which is adjustable.

In a further variation of the device for carrying out the method of the invention the arrangement is that the blast mandrel is fixed preferably directly on the piston of a cylinder which during a movement phase of the piston which is initially adjustable in its duration, is fed with low pressure medium, and during the subsequent final-movement phase of the piston, is fed with high pressure medium.

The invention will now be described with reference to the accompanying drawings, which show by way of example only and in no restrictive sense, embodiments of the device of the invention as follows:

FIGURE 1 is a diagrammatic part-representation of a blast apparatus in which the actuating of the blast mandrel takes place by means of an elbow lever, shown here withdrawn blast mandrel.

FIGURE 2 is a representation of FIGURE 1, with the blast mandrel inserted.

FIGURE 5 is a diagrammatic representation of a variation of the invention, in which the actuating cylinder of the blast mandrel is disposed on a resilient counter-bearing.

FIGURE 6 is a diagrammatic respresentation of a further embodiment of the invention, in which the hydraulic actuating cylinder admits pressure medium with differing pressures.

Figure 3:
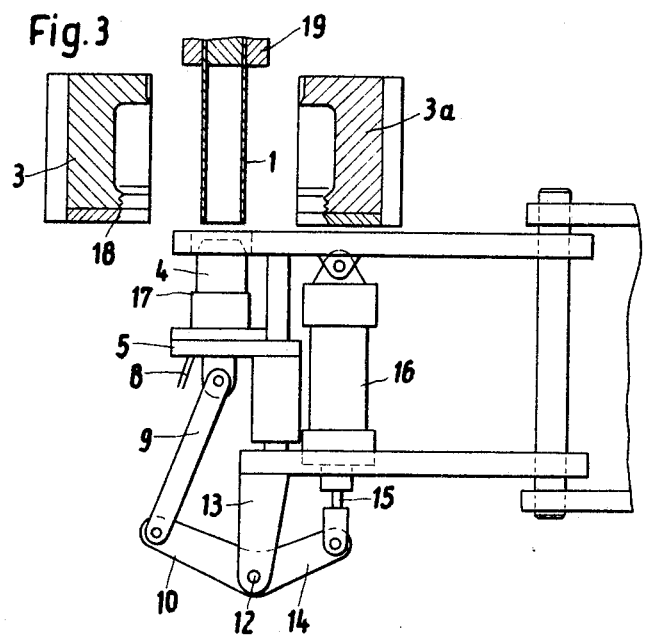
FIGURE 3 is a representation of FIGURE 1 with the blast mandrel introduced from below into the tube.

FIGURE 1 shows the tube blank 1 taken by the gripping device 2 from the nozzle, which is not shown, and lowered into the two-part mould 3, 3a. During the closure movement of the mould the blast mandrel 4 swings with its actuating device over the tube blank 1. The said blast mandrel 4 is fixed on a plate 5 which can be moved up and down on a rod 7 by means of a guide sleeve 6.

Blast air is supplied to the blast mandrel 4 through the tube 8.

An elbow lever or toggle leakage 9, 10 engages on the plate 5, said elbow lever being carried so as to be stationary at point 12 and pivotable in the spline piece 13. In the embodiment shown in the drawing the actuating of the eblow lever 9, 10 from the bent position shown in FIGURE 1 into the approximately straight position of FIGURE 2 takes place by means of a cylinder 16, the piston rod 15 of which engages on the end of a leverpart 14, which itself forms a unit with the lever 10.

As a result of the method of working of the elbow lever 9, 10 arranged in accordance with the invention, a pneumatic cylinder 16 of small diameter with slight drive pressure can be selected, as the necessary end-pressure is produced of necessity by the elbow lever on achieving its approximately straight position. Naturally also a hydraulic cylinder can be used, the constant speed of which acts on the movement of the blast mandrel 4 by means of the elbow lever in such a way that the said blast mandrel is initially actuated at high speed with slight force, but finally, however, with slight speed and great force. By this arrangement of the elbow lever 9, 10, by controlling the speed of the blast mandrel, the advantages obtained is that a well-defined neck opening with satisfactory separating of the waste occurs, as the blank 1 is fully blown up through the slowing down of the mandrel movement brought about by the elbow lever before the separating edge 17 of the blast mandrel 4 meets the conical counter-edge 18 of the mould and squeezes off the waste. The actuating of the elbow lever can take place in any desired way, for example a cylinder can engage directly at the point of bending between the levers 9 and 10, or some other drive element can be used, for example a spindle, a toothed rack or the like, by which the elbow lever 9, 10 is moved out of the bent position into the approximately straight position.

Figure 4:
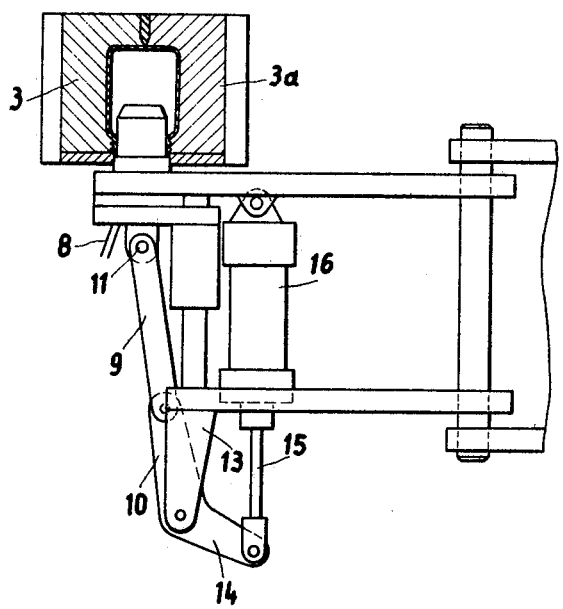
FIGURE 4 is a representation of FIGURE 3, with the blast mandrel inserted.

FIGURES 3 and 4 show the same elbow lever combination 9, 10 as in FIGURES 1 and 2, the difference compared with FIGURES 1 and 2 consisting in that the blast mandrel 4 is inserted from below into the blank 1, which is introduced into the mould directly by the blast nozzle 19.

FIGURE 5 shows a variation of the device of the invention, wherein the blast mandrel 4 is fixed directly on the piston rod 22 of a cylinder 21 which receives the actuating sleeve 20. The pipes 23 and 24 serve for the raising and lowering movement of the sleeve 20 and therewith of the blast mandrel 4. The cylinder 21 is arranged on the piston 25 of a pneumatic cylinder 26 of correspondingly-selected size. The said cylinder 26 is held under a determined, adjustable pressure by means of the pipe 27 with the shut-off valve 28, said pressure being below the end-actuating pressure of the blast and gauging mandrel 4 necessary for the squeezing-off of the waste material. When the cylinder 21 admits pressure medium through the pipe 23, the mandrel 44 moves rapidly into the blank up to just in front of the end-position. With the increasing counter-pressure which is necessary for the squeezing-off, the cylinder 21 shifts over the piston 25 until the pressure in the cylinder 26 underneath the piston 25 is equal to the necessary squeezing-off pressure. In this way the same result is obtained as is given by the elbow lever combination. In place ofthe pneumatic cylinder of course also any other desired springy element can be used in so far as its spring value is adjustable and it has the effect described above.

A further variation is shown in FIGURE 6, in which the cylinder 21 receiving the piston 20 is provided with two-part supply pipe 29, 30. Through the pipe 30 initially low pressure medium is supplied to the cylinder 21 at high speed for the insertion of the gauging mandrel 4 for the blank 1. The low pressure is such that it is not adequate for the squeezing-off of the waste material. When the blast and gauging mandrel 4 has reached the squeezing-off position, when the blowing-up of the blank 1 has taken place, high pressure medium is additionally supplied through the pipe 29 to the cylinder 21 so that now the squeezing-off takes place. The low pressure pipe 30 has a non-return valve 31.

I claim:

1. A device for producing hollow bodies comprising a mould, a blast mandrel adopted for insertion into the mould, a toggle lever connected to the mandrel, and means connected to the toggle lever including an actuating member to insert the blast mandrel into a blank in the mould from a bent position of the lever into an approximately straight position.

2. A device according to claim 1, in which a movable part is provided as to the actuating member with the blast mandrel fixed directly on the movable part and said actuating member having a stationary part to receive a counter-bearing.

3. A device according to claim 2, in which the actuating member includes a piston and cylinder so that the blast mandrel is fixed directly on the piston of the cylinder which during a movement-phase of the piston which is initially adjustable in its duration, is supplied with low pressure medium, and during the subsequent end-movement-phase of the piston is supplied with high pressure medium.

4. A device for the production of hollow bodies as bottles and the like made of plastic, comprising at least a bipartite mold in which a hose-shaped blank is blown up by a mandril calibrating the opening of the neck of the hollow body on the inside and the outside, said mandril being introduced in the blank while the mold is closed, controlling the introduction of the mandril into the blank during a slowing down of its movement and with simultaneous increase in the operating pressure during the blowing up process and up to reaching the end position and cutting off of waste after the blow-up is completed, a toggle joint and a piston-cylinder arrangement has been provided.

References Cited

UNITED STATES PATENTS

| | | | |
|---|---|---|---|
| 2,230,188 | 1/1941 | Ferngren | 18—5 X |
| 2,978,745 | 4/1961 | Langecker | 18—5 X |
| 3,257,687 | 6/1966 | Fogelberg et al. | 18—5 |
| 3,081,489 | 3/1963 | Jackson et al. | 18—5 |
| 3,209,400 | 10/1965 | Di Settembrini | 18—5 |
| 3,209,401 | 10/1965 | Mehnert | 18—5 |
| 3,314,106 | 4/1967 | Latreille et al. | 18—5 |

FOREIGN PATENTS 154,343   11/1953   Australia.

WILBUR L. McBAY, Primary Examiner

U.S. Cl. X.R.

264—94, 98